United States Patent
Elqadah et al.

(10) Patent No.: US 6,746,044 B2
(45) Date of Patent: Jun. 8, 2004

(54) ACTUATABLE FASTENER FOR AIR BAG MODULE VENT

(75) Inventors: Wael S. Elqadah, Gilbert, AZ (US); James P. Lynch, Wyandote, MI (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 31 days.

(21) Appl. No.: 10/034,148

(22) Filed: Dec. 27, 2001

(65) Prior Publication Data

US 2002/0043790 A1 Apr. 18, 2002

(51) Int. Cl.$^7$ ............................................... B60R 21/26
(52) U.S. Cl. ..................... 280/736; 280/740; 280/742
(58) Field of Search ............................ 280/728.3, 736, 280/742, 740

(56) References Cited

U.S. PATENT DOCUMENTS

| | | | | |
|---|---|---|---|---|
| 5,664,802 A | * | 9/1997 | Harris et al. ................. | 280/736 |
| 5,672,841 A | * | 9/1997 | Monk et al. ............. | 102/202.4 |
| 5,695,214 A | | 12/1997 | Faigle et al. | |
| 5,736,668 A | * | 4/1998 | Fogle, Jr. et al. ......... | 102/202.5 |
| 5,918,901 A | * | 7/1999 | Johnson et al. ............. | 280/739 |
| 6,039,346 A | * | 3/2000 | Ryan et al. .................. | 280/736 |
| 6,213,502 B1 | * | 4/2001 | Ryan et al. .................. | 280/736 |
| 6,354,217 B1 | * | 3/2002 | Narumi et al. ........... | 102/202.7 |
| 6,357,791 B1 | * | 3/2002 | Faigle et al. ................ | 280/736 |
| 6,431,596 B1 | * | 8/2002 | Ryan et al. .................. | 280/739 |
| 6,435,549 B1 | * | 8/2002 | Ochiai ......................... | 280/735 |
| 6,439,603 B2 | * | 8/2002 | Damman et al. ........... | 280/736 |
| 6,513,835 B2 | * | 2/2003 | Thomas .................... | 280/743.2 |

\* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

A vehicle occupant protection apparatus (10) comprises an inflatable protection device (14) having a deflated condition and an inflated condition for helping to protect a vehicle occupant. An inflation fluid source (18) is actuatable to provide inflation fluid to inflate the protection device (14). A housing (16) directs inflation fluid from the inflation fluid source (18) toward the protection device (14). The apparatus (10) includes a vent opening (30) in the housing (16) for selectively venting inflation fluid from the housing. The apparatus (10) also includes a member (50) movable between a closed position blocking venting of inflation fluid from the housing (16) and an open position enabling venting of inflation fluid from the housing. The apparatus (10) further includes an actuatable fastener (12) for holding the member (70) in the closed position. The actuatable fastener (12) comprises an air bag inflator initiator (100).

22 Claims, 3 Drawing Sheets

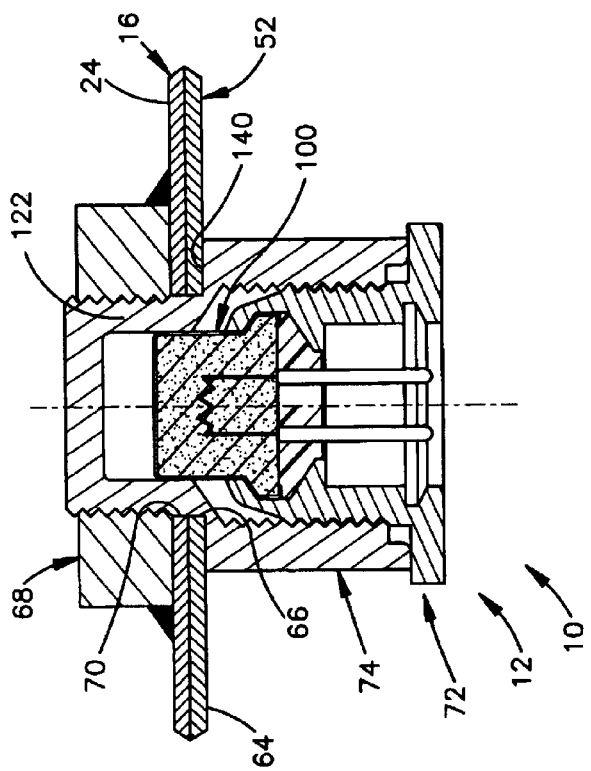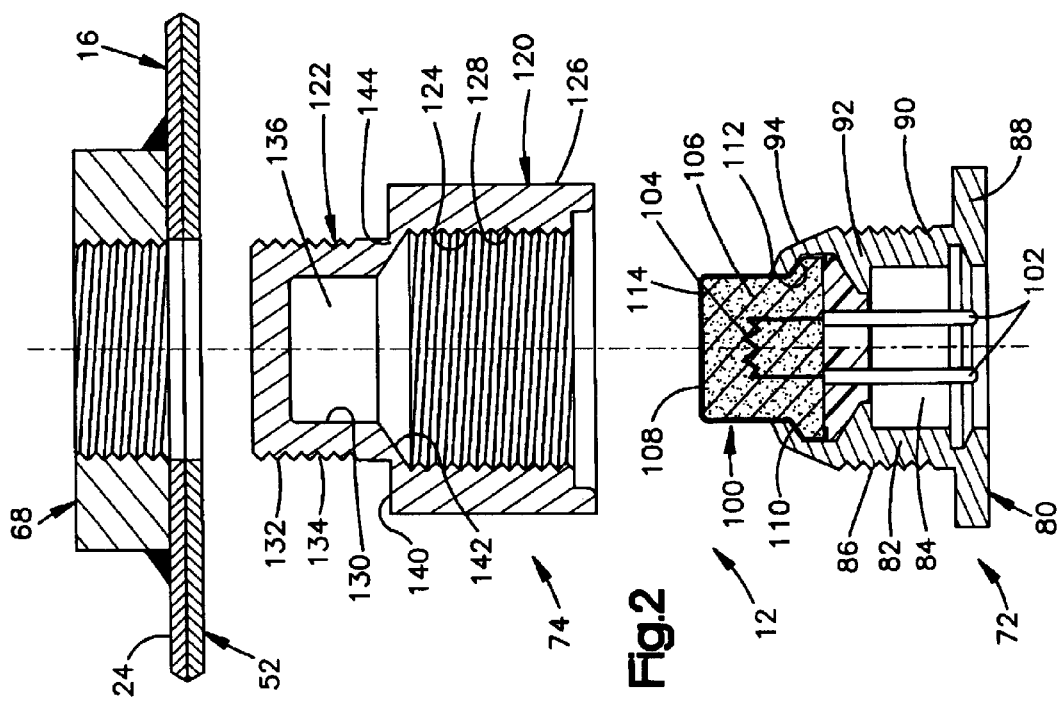

ACTUATABLE FASTENER FOR AIR BAG MODULE VENT

BACKGROUND OF THE INVENTION

1. Technical Field

The present invention relates to an actuatable fastener. In particular, the present invention relates to an actuatable fastener in the form of an explosive bolt for use in an air bag module.

2. Description of the Prior Art

U.S. Pat. No. 5,695,214 shows an air bag module having a door panel movable between a closed condition covering a vent opening and an open condition enabling fluid flow through the vent opening. The door panel is releasably held in the closed condition by an electrically actuatable pyrotechnic fastener, such as, an explosive bolt or rivet. Upon actuation of the fastener, the door panel opens to vent inflation fluid from the module.

SUMMARY OF THE INVENTION

The present invention is a vehicle occupant protection apparatus comprising an inflatable vehicle occupant protection device having a deflated condition and an inflated condition for helping to protect a vehicle occupant. An inflation fluid source is actuatable to provide inflation fluid to inflate the protection device from the deflated condition to the inflated condition. A housing directs inflation fluid from the inflation fluid source toward the protection device upon actuation of the inflation fluid source. The apparatus includes a vent opening in the housing for selectively venting inflation fluid from the housing. The apparatus also includes a member movable between a closed position blocking venting of inflation fluid from the housing and an open position enabling venting of inflation fluid from the housing. The apparatus further includes an actuatable fastener for holding the member in the closed position. The actuatable fastener comprises an air bag inflator initiator.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 2 is an exploded sectional view of the actuatable fastener of FIG. 1;

FIG. 3 is a sectional view of the actuatable fastener of FIG. 1, shown in an assembled and unactuated condition.

DESCRIPTION OF THE INVENTION

Figure 1:
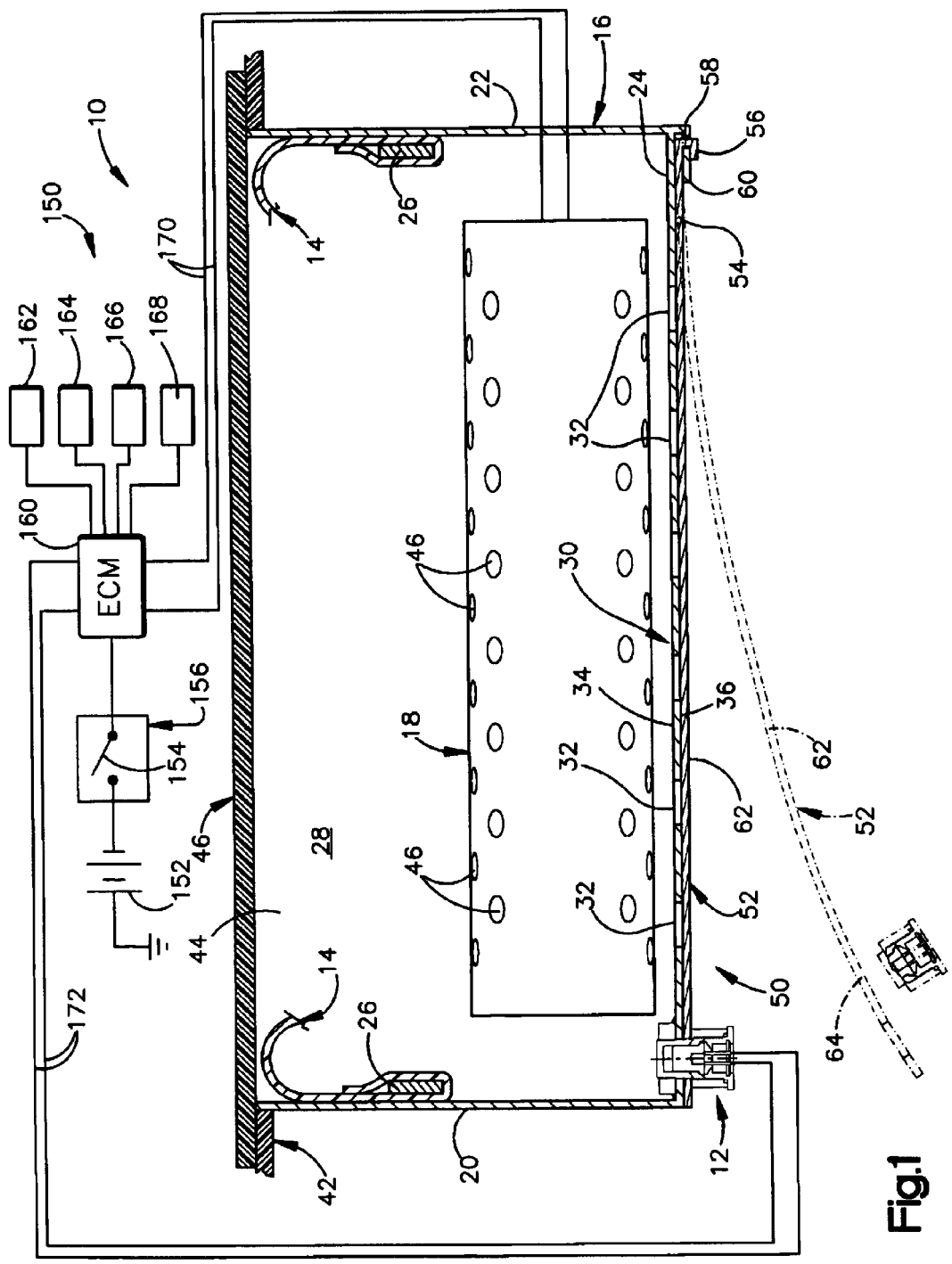
FIG. 1 is a schematic illustration, partially in section, of a vehicle occupant protection apparatus including an actuatable fastener constructed in accordance with a first embodiment of the present invention.

The present invention relates to an actuatable fastener. In particular, the present invention relates to an actuatable fastener for use in an air bag module, in which inflation fluid is selectively vented from the module in order to control the speed and force of deployment of the air bag. As representative of the present invention, FIG. 1 illustrates a vehicle occupant protection apparatus or air bag module 10 including an actuatable fastener 12 constructed in accordance with the present invention.

The air bag module 10 is similar to the air bag module shown in U.S. Pat. No. 5,695,214, and includes an inflatable vehicle occupant protection device 14 of the type commonly known as an air bag. The air bag module 10 also includes a housing 16 and an inflator 18.

The housing 16 is a box-like metal structure having a plurality of walls including first and second opposite side walls 20 and 22 and a back wall 24. The air bag 14 is secured to the side walls 20 and 22 of the housing 16 by a retainer or retaining ring 26. The walls of the housing 16, including the side walls 20 and 22 and the back wall 24, define a chamber 28 in the housing. A vent 30 is formed in the back wall 24 of the housing 14. In the illustrated embodiment, the vent 30 comprises a plurality of spaced apart vent openings 32 that extend through the back wall 24 of the housing 16 between an inner side surface 34 and an outer side surface 36 of the back wall. The vent 30 could be formed in another portion of the housing 16. The vent 30 could also be a single opening.

The housing 16 is mounted in a vehicle instrument panel 42 in a known manner (not shown). The back wall 24 is oriented toward the front of the vehicle in which the air bag module 10 is mounted. A deployment opening 44 is defined between the side walls 20 and 22 of the housing 16. The deployment opening 44 is oriented generally toward the rear of the vehicle in which the air bag module 10 is mounted, that is, toward an occupant of the vehicle. A deployment door or cover 46, which may form a portion of the vehicle instrument panel 42, closes the deployment opening 44 when the air bag 14 is in the deflated condition. Although the housing 16 is shown as a separate structure that is mounted in the instrument panel 42, such a housing could alternatively be defined by the structure of the instrument panel, or by another part of the vehicle from which the air bag 14 is to be inflated to help protect the vehicle occupant.

The inflator 18 is mounted in the chamber 28 of the housing 16 in a known manner (not shown). The inflator 18 comprises a source of inflation fluid for inflating the air bag 14. As known in the art, the inflator 18 may contain an ignitable gas-generating material that, when ignited, rapidly generates a large volume of gas. The inflator 18 may alternatively contain a stored quantity of pressurized inflation fluid, or a combination of pressurized inflation fluid and ignitable material for heating the inflation fluid. The inflator 18 has a plurality of fluid outlet openings 46 through which inflation fluid is directed into the chamber 28 in the housing 16 upon actuation of the inflator.

The air bag module 12 includes a closure assembly 50 for selectively covering the vent openings 40. The closure assembly 50 includes a door panel 52. The door panel 52 is resiliently deformable between an open position as shown in dot-dash lines in FIG. 1 and a closed position as shown in solid lines in FIG. 1. The door panel 52 is biased toward the open position, that is, toward the free state of the door panel, by the inherent resilience of the material from which the door panel is made. In the embodiment illustrated in FIG. 1, the door panel 52 is made of spring steel. It should be understood that the door panel 52 could be made of another resiliently deformable material, such as plastic, or of a non-resilient material.

An inner end portion 54 (FIG. 3) of the door panel 52 includes a hook portion 56 that extends through an opening 58 in a flange portion 60 of the housing 16. The hook portion 56 of the door panel 52 hingedly attaches the door panel to the housing 16. The door panel 52 includes an intermediate portion 62 which, when the door panel is in the closed position illustrated in solid lines in FIG. 1, overlies and covers the vent openings 32 in the back wall 24 of housing 16.

An outer end portion 64 of the door panel 52 has a circular fastener opening 66 (FIG. 3). The back wall 24 of the housing 16 has a circular fastener opening 70 that is coaxial with the fastener opening 66 in the door panel 52. An internally threaded nut 68 is welded or otherwise fixed to the back wall 24 of the housing 16 at the location of the fastener opening 70.

The actuatable fastener 12 includes a bolt portion 72 and a nut portion 74. The bolt portion 72 of the fastener 12 includes a retainer 80 and an initiator 100. The retainer 80 in the illustrated embodiment is preferably formed from a metal, such as stainless steel or aluminum, but could also be formed from another material, such as plastic. The retainer 80 has a cylindrical main wall 82. The main wall 82 defines a connector cavity 84 and is externally threaded at 86.

The retainer 80 has an annular mounting flange 88 that extends radially outward from one end portion 90 of the main wall 82. The retainer 80 has a tubular initiator mounting portion 92 at the end of the main wall 82 opposite the mounting flange 88. The initiator mounting portion 92 of the retainer 80 has a terminal end portion 94 that is crimped over to retain the initiator 100 in the retainer.

The initiator 100 is a known, commercially available product. Specifically, the initiator 100 is a standard, known air bag inflator initiator. This product is a small, relatively inexpensive device, available at a low price in large quantities from a number of different vendors. One initiator 100 that can serve is model AGI from Special Devices Inc. of Mesa, Arizona, internet address www.specialdevices.com. Another initiator that can serve is model LS-PI from LifeSparc of Hollister, Calif., Internet address www.lifesparc.com. This type of initiator costs about $2 each in quantity. In contrast, a standard explosive bolt, such as model Holex from Quantic Industries Inc., of 2751 San Juan Road, Hollister, Calif. 95023, costs in the range of $70 per bolt.

The initiator 100 has two external electrical terminals 102. The terminals 102 are connected internally across a heating element 104, such as a bridgewire. The heating element 104 is electrically energizable, by a flow of electric current across the terminals 102, to ignite a propellant material 106 contained in a can or cover 108.

The initiator 100 has an external surface 110. The initiator mounting portion 92 of the retainer 80 has an internal surface 112 that is the mirror image of the external surface 110 of the initiator 100. The terminal end portion 94 of the retainer 80 is crimped over to retain the initiator 100 in the bolt portion 72 of the fastener 12. A cylindrical end portion 114 of the initiator 100 projects from the retainer 80.

The nut portion 74 of the fastener 12 has a first wall 120 and a second wall 122 that are coaxial. The first wall 120 of the nut portion 74 of the fastener 12 has a cylindrical configuration including parallel inner and outer side surfaces 124 and 126. An internal thread convolution 128 is formed on the inner side surface 124 of the first wall 120 of the nut portion 74 of the fastener 12.

The second wall 122 of the nut portion 74 of the fastener 12 extends axially from adjacent one end of the first wall 120 and has a cylindrical configuration including parallel inner and outer side surfaces 130 and 132. The second wall 122 of the nut portion 74 is smaller in diameter than the first wall 120. An external thread convolution 134 is formed on the outer side surface 132 of the second wall 122. The inner side surface 130 defines an initiator chamber 136 that is only slightly larger than the end portion 114 of the initiator 100.

An annular shoulder surface 140 on the nut portion 74 of the fastener 12 extends radially between the outer side surface 126 of the first wall 120 and the outer side surface 132 of the second wall 122. The nut portion 74 of the fastener 12 also has an internal frustoconical surface 142 that extends between the inner side surface 124 of the first wall 120 and the inner side surface 130 of the second wall 122. The material of the nut portion 74 is relatively thin, and the nut portion is therefore relatively weak, in the area 144 between the frustoconical inner surface 142 and the outer shoulder surface 140.

In assembly of the fastener 12, the bolt portion 72 of the fastener is screwed into the nut portion 74 of the fastener. The external thread 86 on the main wall 82 of the bolt portion screws into the internal thread 128 on the first wall 120 of the nut portion. As a result, the bolt portion 72 of the fastener 12 is secured to the nut portion 74. The end portion 114 of the initiator 100 extends into the initiator chamber 136 defined by the second wall 122 of the nut portion 74, and substantially fills the initiator chamber. A thread locking adhesive (not shown) may be used to help secure the bolt portion 72 to the nut portion 74.

When the fastener 12 is assembled to the housing 16, the nut portion 74 of the fastener is inserted through the fastener opening 66 in the door panel 52 of the housing and through the fastener opening 70 in the back wall 24 of the housing. The shoulder surface 140 on the nut portion 74 engages the door panel 52. The externally threaded second wall 122 of the nut portion 74 of the fastener 12 is screwed into the nut 68 to secure the fastener to the housing 16.

When the actuatable fastener 12 is thus secured on the housing 16, the door panel 52 and the back wall 24 are clamped together between the weld nut 68 and the shoulder surface 140 on the nut portion of the fastener. The door panel 52, when in the closed position shown in solid lines in FIG. 1, blocks venting of inflation fluid through the vent openings 32.

The vehicle protection apparatus 10 includes vehicle electric circuitry indicated schematically at 150. The vehicle electric circuitry 150 includes a power source 152, which is preferably the vehicle battery and/or a capacitor, and a normally open switch 154. The switch 154 is part of a sensor 156 that senses a condition indicating the occurrence of a vehicle collision. The collision-indicating condition may comprise, for example, sudden vehicle deceleration caused by a collision. The vehicle electric circuitry 150 also includes an electronic control module 160. The vehicle electric circuitry 150 further includes a plurality of vehicle condition and/or occupant condition sensors, such as an occupant position sensor 162, an occupant size or weight sensor 164, a module temperature sensor 166, and a crash severity sensor 168.

If the collision-indicating condition sensed by the sensor 156 indicates the occurrence of a collision for which inflation of the air bag 14 is desired to help protect the occupant of the vehicle, the sensor 156 closes the switch 154. The control module 160 then sends an actuation signal to the inflator 18 over lead wires 170. When the inflator 18 is actuated, it emits a large volume of inflation fluid into the chamber 28 in the housing 16. The housing 16 directs the inflation fluid from the inflator 18 into the air bag 12 to inflate the air bag. As the inflation fluid begins to inflate the air bag 12, the air bag moves rapidly outward and forcefully against the deployment door 46. The inflating air bag 12 moves the deployment door 46 outward and the air bag inflates through the deployment opening 44 into a position to help protect the vehicle occupant.

The control module 150 looks at the signals from the sensors 162–168 to determine whether it is desirable to open the door panel 52 upon the occurrence of a condition requiring actuation of the inflator 18. This determination, as well as the opening of the door panel 52 itself, can be made prior to actuation of the inflator 18, or at the same time as actuation of the inflator, or after actuation of the inflator.

If, for example, the signal from the occupant position sensor 162 indicates that the vehicle occupant is closer than a predetermined distance to the air bag module 10, then the control module 160 determines that the door panel 52 should be opened to vent inflation fluid from the housing 16 in order to reduce the speed and force of the inflating air bag 12. In a similar manner, if the signal from the occupant size sensor 164 indicates that the vehicle occupant is smaller than a predetermined size, then the control module 160 determines that the door panel 52 should be opened. Further, if the signal from the temperature sensor 166 indicates that the ambient temperature at the air bag module 10 is above a predetermined temperature, then the control module 160 determines that the door panel 52 should be opened. The output from the crash severity sensor 168 also is looked at to determine whether the vehicle condition is such that inflation fluid should be vented from the housing 16.

In the event that the control module 160 determines that the door panel 52 should be opened, a control signal is sent from the control module, through lead wires 172, to the terminals 102 of the actuatable fastener 12. The fastener 12 is actuated and releases the outer end portion 64 of the door panel 52.

Specifically, an electric current flows through the initiator 100 and ignites the propellant 106. The ignited propellant 106 in the initiator 100 produces combustion products that flow into the initiator chamber 136. The force of the combustion products ruptures the nut portion 74 of the fastener 12 at the weakened location 144. When the nut portion 74 of the fastener ruptures 12, the first wall 120 of the nut portion separates from the second wall 122 of the nut portion. The second wall 122 of the nut portion 74, which is screwed into the weld nut 68 on the back wall 24 of the housing 16, remains with the housing 16. The first wall 120 of the nut portion 74, and the bolt portion 72, break off and move away from the back wall 24 of the housing 16.

The door panel 52 is thus released for movement away from the back wall 24 of the housing 16. Specifically, the outer end portion 64 of the door panel 52 moves, due to the bias of the material from which it is made, if any, the force of the exploding bolt 12, and possibly force of inflation fluid in the housing 16, from the closed position shown in solid lines in FIG. 1 to the open position shown in dot-dash lines in FIG. 1. When the door panel 52 moves from the closed position to the open position, the vent openings 32 in the back wall 24 of the housing 16 are uncovered. The uncovering of the vent openings 32 enables inflation fluid from the inflator 18 to flow out of the housing 16 through the vent openings.

The inflation fluid that flows out of the housing 16 through the vent openings 32 does not flow into the air bag 14 to inflate the air bag. As a result, the amount of inflation fluid flowing into the air bag 14, or the pressure of the inflation fluid, is reduced as compared to the amount or pressure of inflation fluid flowing into the air bag when the vent openings 32 remain covered by the closed door panel 52. This change in the flow of inflation fluid can help to reduce or control the speed and force of deployment of the air bag 14. In addition, the vent opening 32 can be uncovered after partial or full inflation of the air bag 14. This can vent inflation fluid and decrease pressure in the air bag 14.

The vehicle condition and occupant condition sensors that control actuation of the actuatable fastener 12 can sense conditions other than occupant position, occupant size, crash severity, and module temperature. For example, a vehicle condition sensor might sense the presence of a rearward-facing child seat, and the control module 160 could then determine that all or substantially all of the inflation fluid from the inflator 18 should be vented from the housing 16 rather than directed into the air bag 14.

The control module 160 can determine not only whether, but also when, inflation fluid from the inflator 10 should be vented from the housing 16. For example, it may be desirable to open the door panel 52 of the housing 16 at a time either before or after the time of actuation of the inflator 18. Electronic control modules that are capable of controlling the time of actuation of the actuatable fastener 12, as well as the actuation itself, in response to the signals from the condition sensors, are known.

Figure 4:
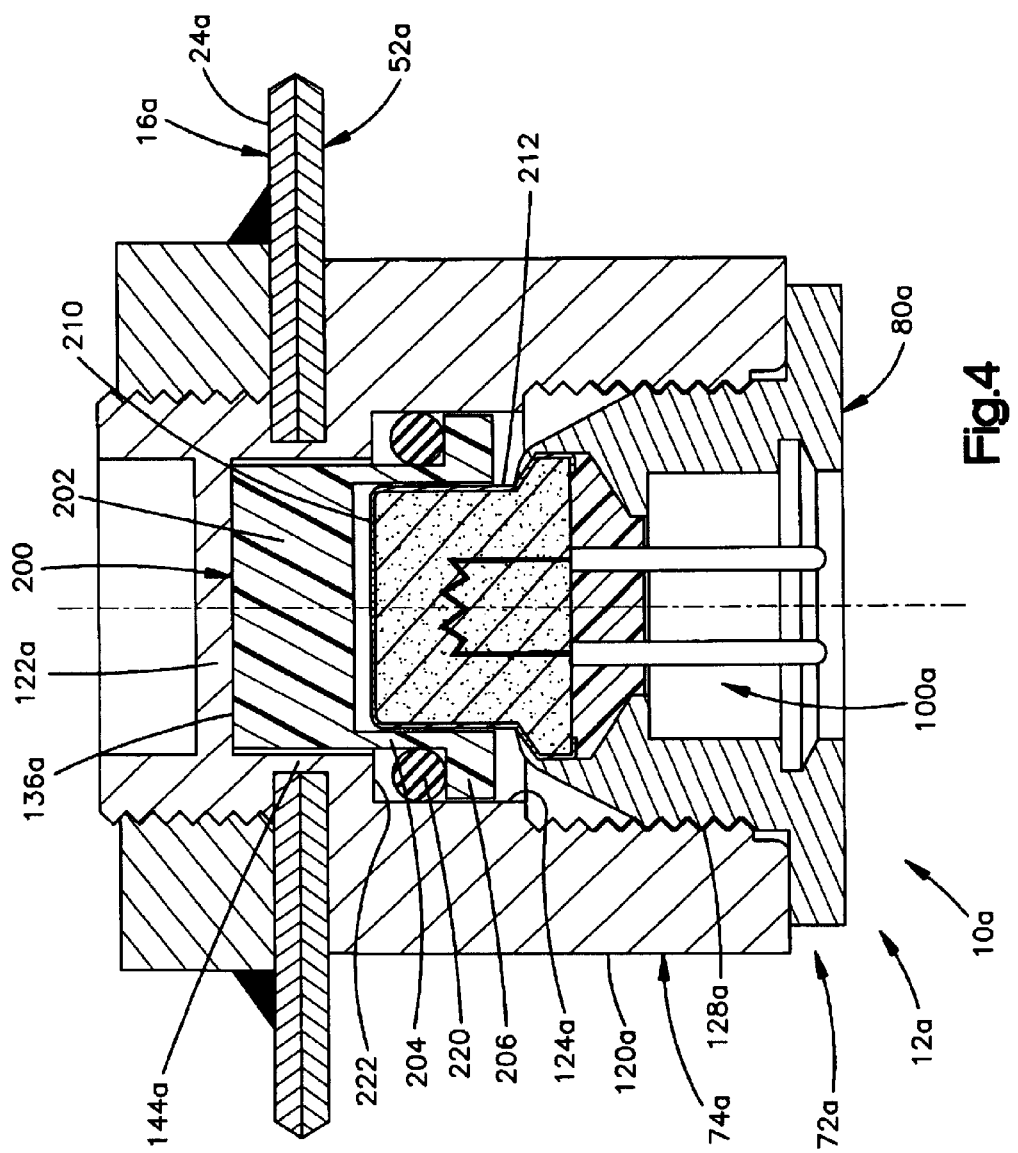
FIG. 4 is a sectional view similar to FIG. 3 of a fastener constructed in accordance with a second embodiment of the present invention.

FIG. 4 illustrates a portion of a vehicle occupant protection apparatus or air bag module 10a including an actuatable fastener 12a constructed in accordance with a second embodiment of the present invention. The fastener 12a is similar to the fastener 12 (FIGS. 1–3). Parts of the fastener 12a that are similar to or perform the same function as parts of the fastener 12 are given the same reference numeral with the suffix "a" added.

The fastener includes a bolt portion 72a and a nut portion 74a. The bolt portion 72a of the fastener 12a includes a retainer 80a and an initiator 10a.

The nut portion 74a of the fastener 12a has a first wall 120a and a second wall 122a. An internal thread convolution 128a is formed on the inner side surface 124a of the first wall 120a of the nut portion 74a of the fastener 12a. A thin, frangible cylindrical wall portion 144a of the nut portion 74a of the fastener 12a extends axially from the first wall portion 120a. The second wall 122a of the nut portion 74a of the fastener 12a extends radially inward from the frangible wall portion 144a and caps an initiator chamber 136a of the fastener 12a.

The fastener 12a also includes a flash cup 200. The flash cup 200 is a device for helping to prevent the combustion products of the initiator 100a, including the flash that occurs when it is actuated, from being visible or otherwise sensed by an occupant of the vehicle. The flash cup 200 may be made of metal or, as shown, of plastic. The flash cup 200 has a cup-shaped configuration including a radially extending end wall 202 and a cylindrical, axially extending side wall 204. An annular sealing flange 206 extends radially outward from the end of the side wall 204 opposite the end wall 202.

The flash cup 200 is located inside the initiator chamber 136a. The end wall 202 of the flash cup 200 overlies an outer end surface 210 of the initiator 100a and is disposed between the initiator and the second wall 122a of the nut portion 74a. The side wall 204 of the flash cup 200 extends around an outer side surface 212 of the initiator 100a. The sealing flange 206 of the flash cup 200 extends outward to the inner side surface 124a of the first wall 120a of the nut portion 74a.

The fastener 12a also includes a sealing element in the form of an O-ring 220. The O-ring 220 is disposed between the side wall and sealing flange 204 and 206 of the flash cup 200, and the nut portion 74a of the fastener 12a.

When the initiator 100a is actuated, the combustion products of the initiator 10a impinge upon the flash cup 200 and force it to move axially toward the second wall 122a of the nut portion 74a, that is, in an upward direction as viewed in FIG. 4. The force of the moving flash cup 200 is transmitted to the second wall 122a and causes the frangible portion 144a of the nut portion 74a to rupture. This rupturing of the nut portion 74a enables the door panel 52a to be released for movement away from the back wall 24a of the housing 16a. Such movement enables inflation fluid to flow out of the housing 16a through one or more vent openings (not shown).

When the flash cup 200 moves in this manner relative to the nut portion 74a, the O-ring 220 is captured between the sealing flange 206 of the flash cup and a shoulder surface 222 on the nut portion 74a. The O-ring 220 seals between the flash cup 200 and the nut portion 74a of the fastener 12a. The O-ring 220 blocks flow of combustion products of the initiator 100a out of the initiator chamber 136a, even though the nut portion 74a is ruptured, because the flash cup 200 stays with the first wall 120a and thus with the body of the initiator. The O-ring 220 and flash cup 200 also block visibility of combustion products of the initiator 10a by an occupant of the vehicle in which the apparatus 10a is mounted.

From the above description of the invention, those skilled in the art will perceive improvements, changes and modifications in the invention. For example, the actuatable fastener is usable in air bag modules other than the illustrated passenger-side module, such as a driver-side module or a side impact module. The door panel need not be resilient and would then move in response to the explosive force of the bolt. Alternatively, the door panel could be a part of a housing wall rather than a separate member covering an opening in a housing wall, with the opening in the wall being formed only by movement or separation of the part of the housing wall. Such improvements, changes and modifications within the skill of the art are intended to be covered by the appended claims.

We claim:

1. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said inflation fluid source toward said protection device upon actuation of said inflation fluid source;
   a vent opening in said housing for selectively venting inflation fluid from said housing;
   a member pivotally movable between a closed position blocking venting of inflation fluid from said housing and an open position wherein said member is pivoted away from said vent opening, the open position enabling venting of inflation fluid from said housing; and
   an actuatable fastener for holding said member in the closed position, said actuatable fastener comprising an air bag inflator initiator.

2. An apparatus as set forth in claim 1 wherein said actuatable fastener comprises a retainer securing said initiator in said actuatable fastener.

3. An apparatus as set forth in claim 1 wherein said actuatable fastener comprises a bolt and a nut.

4. An apparatus as set forth in claim 1 wherein said initiator comprises a pair of terminal pins, a heating element electrically connected across said terminal pins, and an ignitable material ignitable by said heating element.

5. An apparatus as set forth in claim 4 wherein said initiator is crimped into said actuatable fastener.

6. An apparatus as set forth in claim 1 further comprising a flash cup for helping to block visibility of combustion products of said initiator by an occupant of the vehicle.

7. An apparatus as set forth in an claim 6 comprising an opening and a member movable between a closed position covering said opening and an open position enabling fluid flow through said opening, said actuatable fastener holding said member in the closed position.

8. An apparatus as set forth in claim 6 wherein said actuatable fastener comprises a retainer securing said initiator in said actuatable fastener.

9. An apparatus as set forth in claim 6 wherein said actuatable fastener comprises a bolt and a nut.

10. An apparatus as set forth in claim 9 wherein said initiator is crimped into said actuatable fastener.

11. An apparatus as set forth in claim 6 wherein said initiator comprises a pair of terminal pins, a heating element electrically connected across said terminal pins, and an ignitable material ignitable by said heating element.

12. A vehicle occupant protection apparatus comprising:
    an inflatable vehicle occupant protection device having a deflated condition and an inflated condition for helping to protect a vehicle occupant;
    an inflation fluid source actuatable to provide inflation fluid to inflate said protection device from the deflated condition to the inflated condition;
    a housing for directing inflation fluid from said inflation fluid source toward said protection device upon actuation of said inflation fluid source;
    a vent opening in said housing for selectively venting inflation fluid from said housing;
    a member movable between a closed position blocking venting of inflation fluid from said housing and an open position enabling venting of inflation fluid from said housing;
    an actuatable fastener for holding said member in the closed position, said actuatable fastener comprising an air bag inflator initiator; and
    a sealing member for helping to block flow of combustion products of said initiator out of said fastener.

13. A vehicle occupant protection apparatus comprising:
    an inflatable vehicle occupant protection device having a deflated condition and an inflated condition for helping to protect a vehicle occupant;
    an inflation fluid source actuatable to provide inflation fluid to inflate said protection device from the deflated condition to the inflated condition;
    a housing for directing inflation fluid from said inflation fluid source toward said protection device upon actuation of said inflation fluid source;
    a vent opening in said housing for selectively venting inflation fluid from said housing;
    a member movable between a closed position blocking venting of inflation fluid from said housing and an open position enabling venting of inflation fluid from said housing; and
    an actuatable fastener for holding said member in the closed position, said actuatable fastener comprising an air bag inflator initiator, said bolt comprising a retainer crimped on said initiator, said bolt including said initiator being screwed into said nut.

14. An apparatus as set forth in claim 13 wherein said nut is screwed into a threaded portion on said housing to secure said actuatable fastener to said housing.

15. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said inflation fluid source toward said protection device upon actuation of said inflation fluid source;
   a vent opening in said housing for selectively venting inflation fluid from said housing;
   a member movable between a closed position blocking venting of inflation fluid from said housing and an open position enabling venting of inflation fluid from said housing;
   a flash cup for helping to block visibility of combustion products of said initiator by an occupant of the vehicle; and
   an actuatable fastener for holding said member in the closed position, said actuatable fastener comprising an air bag inflator initiator,
   said flash cup comprising a member movable within said fastener from a first position to a second position in sealing engagement with a portion of said fastener, said member, when moving from the first position to the second position, causing rupturing of a portion of said fastener.

16. An apparatus as set forth in claim 15 further comprising a sealing member for helping to block flow of combustion products of said initiator out of said fastener.

17. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said inflation fluid source toward said protection device upon actuation of said inflation fluid source;
   a vent opening in said housing for selectively venting inflation fluid from said housing;
   a member movable between a closed position blocking venting of inflation fluid from said housing and an open position enabling venting of inflation fluid from said housing;
   a flash cup for helping to block visibility of combustion products of said initiator by an occupant of the vehicle; and
   an actuatable fastener for holding said member in the closed position, said actuatable fastener comprising an air bag inflator initiator,
   said flash cup comprising a member movable within said fastener from a first position to a second position in sealing engagement with a portion of said fastener, said member, when moving from the first position to the second position, causing rupturing of a portion of said fastener,
   said opening being a vent opening in a housing of said apparatus.

18. An apparatus as set forth in claim 17 wherein said nut is screwed into a threaded portion on said housing to secure said actuatable fastener to said housing.

19. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said inflation fluid source toward said protection device upon actuation of said inflation fluid source;
   a vent opening in said housing for selectively venting inflation fluid from said housing;
   a member movable between a closed position blocking venting of inflation fluid from said housing and an open position enabling venting of inflation fluid from said housing; and
   an actuatable fastener for holding said member in the closed position, said actuatable fastener comprising an air bag inflator initiator, a bolt, and a nut,
   said bolt comprising a retainer crimped on said initiator, said bolt including said initiator being screwed into said nut.

20. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said Inflation fluid source toward said protection device upon actuation of said inflation fluid source;
   a vent opening in said housing for selectively venting inflation fluid from said housing;
   a member movable between a closed position blocking venting of inflation fluid from said housing and an open position enabling venting of inflation fluid from said housing; and
   an actuatable fastener for holding said member in the closed position, said actuatable fastener comprising an air bag inflator initiator,
   said one of said movable member and said housing having a threaded portion, said nut of said fastener being screwed into said threaded portion to secure said fastener to said movable member.

21. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said protection device from the deflated condition to the inflated condition;
   a housing for directing inflation fluid from said inflation fluid source toward said protection device upon actuation of said inflation fluid source;

a vent opening in said housing for selectively venting inflation fluid from said housing;

a member movable between a closed position blocking venting of inflation fluid from said housing and an open position enabling venting of inflation fluid from said housing; and an actuatable fastener for holding said member in the closed position, said actuatable fastener comprising an air bag inflator initiator, a bolt, and a nut, one of said member and said housing having a threaded portion, said nut of said fastener being screwed into said threaded portion to secure said fastener to said movable member.

22. A vehicle occupant protection apparatus comprising:

an actuatable fastener having an air bag inflator initiator; and a flash cup for helping to block visibility of combustion products of said initiator by an occupant of the vehicle, said flash cup comprising a member movable within said fastener from a first position to a second position in sealing engagement with a portion of said fastener, said member when moving from the first position to the second position causing rupturing of a portion of said fastener, and further comprising a sealing member for helping to block flow of combustion products of said initiator out of said fastener.

* * * * *